(12) United States Patent
Banuelos

(10) Patent No.: US 11,904,408 B1
(45) Date of Patent: Feb. 20, 2024

(54) LASER WELDING MASK

(71) Applicant: Rivian IP Holdings, LLC, Irvine, CA (US)

(72) Inventor: Leo Caballero Banuelos, Orange, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/345,787

(22) Filed: Jun. 30, 2023

(51) Int. Cl.
| | |
|---|---|
| *B23K 26/21* | (2014.01) |
| *B23K 37/04* | (2006.01) |
| *H01M 50/516* | (2021.01) |
| *H01M 50/55* | (2021.01) |
| *H01M 50/503* | (2021.01) |
| *H01M 50/213* | (2021.01) |
| *B23K 101/36* | (2006.01) |

(52) U.S. Cl.
CPC .......... *B23K 26/21* (2015.10); *B23K 37/0443* (2013.01); *H01M 50/213* (2021.01); *H01M 50/503* (2021.01); *H01M 50/516* (2021.01); *H01M 50/55* (2021.01); *B23K 2101/36* (2018.08)

(58) Field of Classification Search
CPC .......... B23K 26/21; B23K 37/0443; B23K 2101/36; H01M 50/566; H01M 50/503; H01M 50/516; H01M 50/55; H01M 50/213; H01M 2220/20
See application file for complete search history.

(56) References Cited

U.S. PATENT DOCUMENTS

| | | | |
|---|---|---|---|
| 11,742,553 B1* | 8/2023 | Kathpalia | H01M 50/566 |
| | | | 429/163 |
| 2020/0139486 A1* | 5/2020 | Shimazoe | B23K 26/21 |
| 2020/0290162 A1* | 9/2020 | Kim | H01M 50/516 |
| 2020/0365863 A1* | 11/2020 | Kim | B23K 37/04 |
| 2021/0344083 A1* | 11/2021 | Kim | H01M 50/50 |
| 2022/0302543 A1* | 9/2022 | Kim | H01M 50/211 |

* cited by examiner

*Primary Examiner* — Brian W Jennison
(74) *Attorney, Agent, or Firm* — PATTERSON + SHERIDAN, LLP

(57) ABSTRACT

A laser welding mask and a method for facilitating laser welding are provided. The laser welding mask includes a guide plate, a number of clamp plungers, and a number of clamp springs. The guide plate is attached to a load plate. The guide plate defines a number of openings that extend from an upper surface to a lower surface. Each clamp plunger is disposed within one of the openings in the guide plate, and each clamp plunger defines at least one passage configured to pass a laser welding beam. At least one clamp spring is disposed between each clamp plunger and the load plate.

20 Claims, 15 Drawing Sheets

LASER WELDING MASK

INTRODUCTION

The present disclosure relates to laser welding. More particularly, the present disclosure relates to a laser welding mask.

SUMMARY

Embodiments of the present disclosure advantageously provide a laser welding mask and a method to facilitate laser welding. In certain embodiments, the laser welding mask includes a guide plate, a number of clamp plungers, and a number of clamp springs. The guide plate is attached to a load plate. The guide plate defines a number of openings that extend from an upper surface to a lower surface. Each clamp plunger is disposed within one of the openings in the guide plate, and each clamp plunger defines at least one passage configured to pass a laser welding beam. At least one clamp spring is disposed between at least one clamp plunger and the load plate.

DETAILED DESCRIPTION

Laser welding may be used during electric vehicle battery manufacturing to connect the CCA to a large number of battery cells in a battery cell carrier. The laser welding process is difficult to perform rapidly and accurately in a fully automated high-volume assembly line because the CCA has to properly contact the positive and negative terminals of each battery cell so that a laser weld can be correctly formed.

Certain embodiments of the present disclosure advantageously provide a laser welding mask, and, more particularly, a laser welding mask for laser welding single-sided CCA-to-cell interconnects for an electric vehicle battery. The laser welding mask not only rapidly and accurately positions the laser welds, but also advantageously applies clamping pressure to the CCA during the laser welding process.

In certain embodiments, the laser welding mask includes a guide plate, a number of clamp plungers, and a number of clamp springs. The guide plate is attached to a load plate. The guide plate defines a number of openings that extend from an upper surface to a lower surface. Each clamp plunger is disposed within one of the openings in the guide plate, and each clamp plunger defines at least one passage configured to pass a laser welding beam. At least one clamp spring is disposed between at least one clamp plunger and the load plate.

In certain embodiments, two or more laser welding masks may be attached together to form a multi-panel laser welding mask that compensates for the dimensional tolerances of plastic injection-molded battery cell carriers, as well as for battery cell carriers with large dimensional differences (such as different widths, etc.).

In certain embodiments, physical datums accurately register or align the battery cell carrier and the laser welding mask, such as guide pins on the laser welding mask and corresponding guide pin openings or holes in the battery cell carrier. Additionally, the physical datums simultaneously serve as visual fiducials for a computer vision system to precisely align the laser welding pattern of a robotic laser welding system to the positive and negative terminals of the battery cells within the battery cell carrier.

Figure 1A:
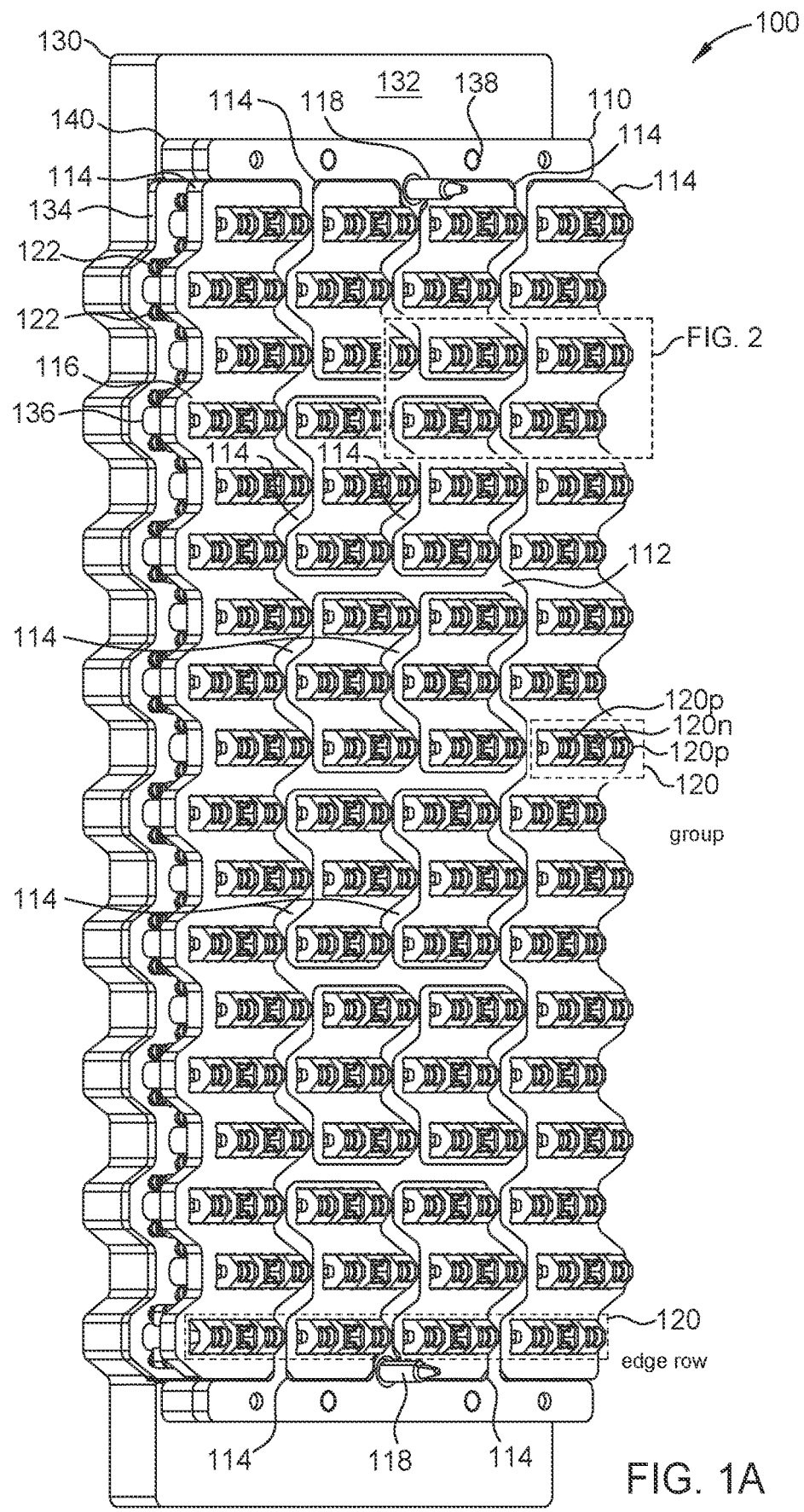
FIG. 1A depicts a perspective view of an example laser welding mask, in accordance with embodiments of the present disclosure.

FIG. 1A depicts a perspective view of laser welding mask 100, in accordance with embodiments of the present disclosure.

In certain embodiments, laser welding mask 100 includes, inter alia, guide plate 110, clamp plungers 120, clamp springs 122, and load plate 130.

Guide plate 110 includes stiffener portion 112 and insulator portions 114. Stiffener portion 112 is attached to insulator portions 114 using mechanical fasteners, such as screws, bolts, rivets, studs, etc., or other attachment methods, such as welding, etc. Stiffener portion 112 provides strength, stiffness, etc. to guide plate 110, while insulator portions 114 surround and electrically insulate clamp plungers 120 from one another. Each insulator portion 114 of guide plate 110 defines openings 116 that extend from an upper surface to a lower surface, and each opening 116 is configured to receive one clamp plunger 120.

In the embodiment depicted in FIG. 1A, guide plate 110 includes two outer insulator portions 114 and 12 inner insulator portions 114; other arrangements may also be used.

Each outer insulator portion 114 includes 18 groups of clamp plungers 120, while each inner insulator portion 114 includes 3 groups of clamp plungers 120. Each group includes 3 clamp plungers 120.

Stiffener portion 112 may be formed from metal, composite material, etc., such as aluminum, light-weight steel, carbon fiber, etc., while insulator portions 114 may be formed from an electrical insulating material, a dielectric material, etc., such as Teflon, etc. The area and arrangement of stiffener portion 112 relative to the total area and arrangement of insulator portions 114 may depend on several factors, such as the dimensions of guide plate 110, the number of clamp plungers 120, the weight of laser welding plate 100, etc.

In certain embodiments, two or more guide pins 118 extend from the lower surface of stiffener portion 112 of guide plate 110. Each guide pin 118 is configured to align guide plate 110 and the battery cell carrier. In some embodiments, two tapered guide pins 118 extend from the lower surface of stiffener portion 112 of guide plate 110. One tapered guide pin 118 is disposed at one end of stiffener portion 112 of guide plate 110, and is configured to cooperate with a respective circular-shaped opening in the battery cell carrier. Another tapered guide pin 118 is disposed at the other end of stiffener portion 112 of guide plate 110, and is configured to cooperate with a respective oval-shaped opening in the battery cell carrier. The oval-shaped opening compensates for battery cell carrier dimensional tolerance in the direction of the long axis of the opening.

Guide plate 110 may be attached to load plate 130 using mechanical fasteners 138, such as screws, bolts, rivets, studs, etc., or other attachment methods, such as welding, etc. In certain embodiments, guide plate 110 may be removed from load plate 130 to service, repair or replace clamp plungers 120 and clamp springs 122.

Load plate 130 may be formed from metal, composite material, etc., and includes body 132 and insulator surface 134 that faces guide plate 110. Load plate 130 defines passages 136 that extend from the outer surface of body 132, through body 132 and insulator surface 134, to the outer surface of insulator surface 134. Each passage 136 is configured to pass a laser welding beam. Body 132 may be formed from metal, such as aluminum, light-weight steel, etc., and insulator surface 134 may be formed from an electrical insulating material, a dielectric material, etc., such as Teflon, etc. Load plate 130 provides the primary strength, rigidity, etc. for laser welding mask 100, which spans the battery cell carrier and clamps the CCA to the battery cells during laser welding, as discussed below.

Standoff bracket 140 may be disposed between guide plate 110 and load plate 130 to adjust the distance or air gap between guide plate 110 and load plate 130, as well as to adjust the preload of clamp springs 122. Standoff bracket 140 formed from metal, composite material, etc., such as aluminum, light-weight steel, carbon fiber, etc.

In the embodiment depicted in FIG. 1A, clamp plungers 120 are generally arranged in 18 rows, and each row includes 4 groups of 3 clamp plungers 120. An edge row and a group of clamp plungers 120 are identified in FIG. 1A. Each group of clamp plungers 120 includes one negative clamp plunger 120n disposed between two positive clamp plungers 120p. In certain embodiments, each group of clamp plungers 120 is disposed below a different passage 136 in load plate 130, and above two adjacent battery cells in the battery cell carrier. Generally, the number and arrangement of clamp plungers 120 depends on the arrangement of the battery cells within the battery cell carrier. Because clamp plungers 120 are surrounded by insulator portions 114, clamp plungers 120 may be formed from metal, such as aluminum, light-weight steel, etc., a non-conducting material, etc. Each clamp plunger 120 defines at least one passage configured to pass a laser welding beam, and at least one clamp spring 122 is disposed between each clamp plunger 120 and load plate 130.

Figure 1B:
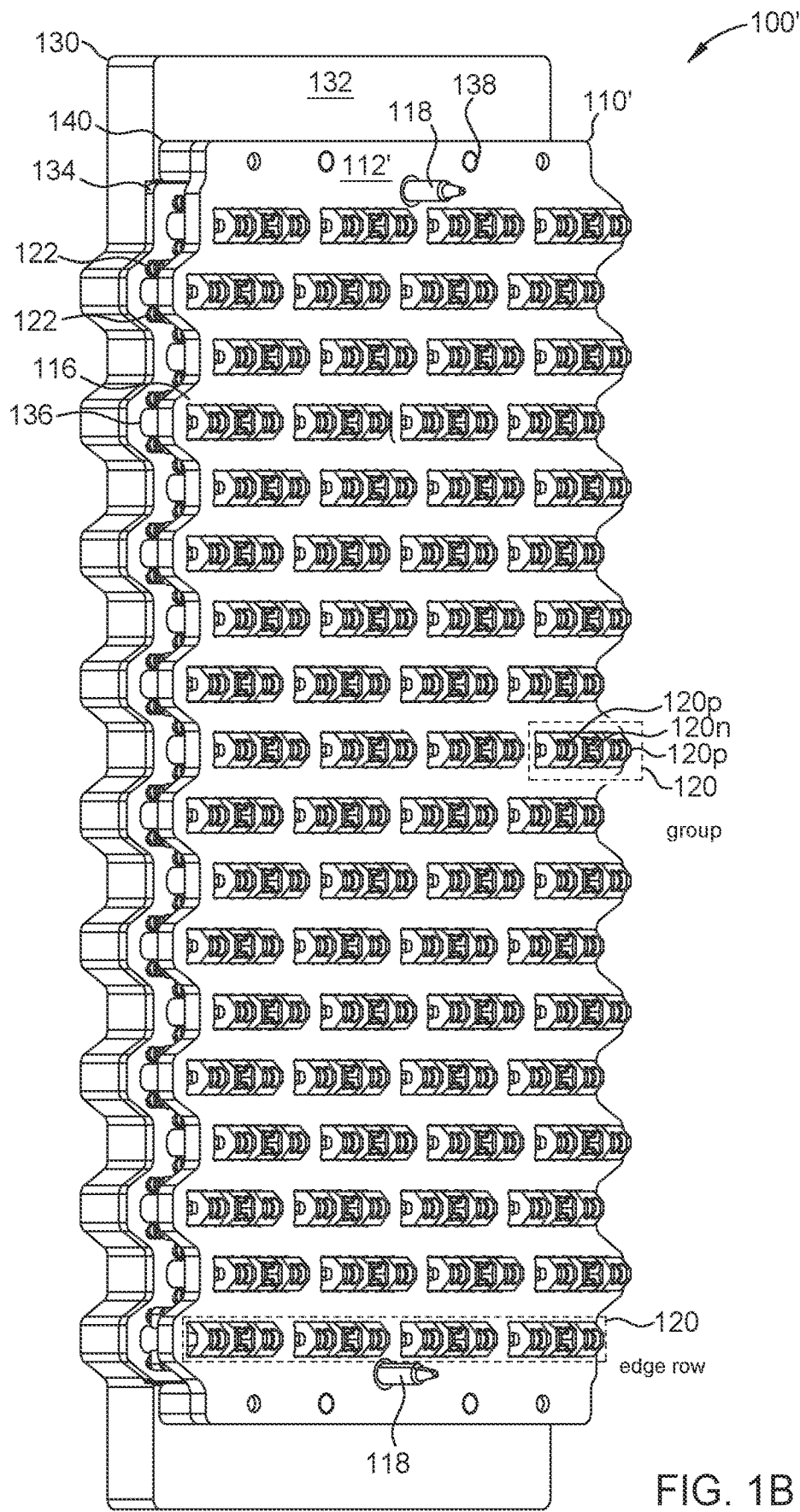
FIG. 1B depicts a perspective view of another example laser welding mask, in accordance with embodiments of the present disclosure.

FIG. 1B depicts a perspective view of laser welding mask 100', in accordance with embodiments of the present disclosure.

In certain embodiments, laser welding mask 100' includes, inter alia, guide plate 110', clamp plungers 120, clamp springs 122, and load plate 130.

Guide plate 110' includes body 112' that provides strength, stiffness, etc., to guide plate 110'. Body 112' may be formed from metal, composite material, etc., such as aluminum, light-weight steel, carbon fiber, etc. Body 112' of guide plate 110' defines openings 116 that extend from an upper surface to a lower surface, and each opening 116 is configured to receive one clamp plunger 120. Clamp plungers 120 may be formed from an electrical insulating material, a dielectric material, etc., such as Teflon, etc.

In certain embodiments, two or more guide pins 118 extend from the lower surface of body 112' of guide plate 110'. Each guide pin 118 is configured to align guide plate 110' and the battery cell carrier. In some embodiments, two tapered guide pins 118 extend from the lower surface of body 112' of guide plate 110'. One tapered guide pin 118 is disposed at one end of body 112' of guide plate 110', and is configured to cooperate with a respective circular-shaped opening in the battery cell carrier. Another tapered guide pin 118 is disposed at the other end of body 112' of guide plate 110', and is configured to cooperate with a respective oval-shaped opening in the battery cell carrier.

Guide plate 110' may be attached to load plate 130 using mechanical fasteners, such as screws, bolts, rivets, studs, etc., or other attachment methods, such as welding, etc. In certain embodiments, guide plate 110' may be removed from load plate 130 to service, repair or replace clamp plungers 120 and clamp springs 122.

Load plate 130 may be metal, composite material, etc., and includes body 132 and insulator surface 134 that faces guide plate 110'. Load plate 130 defines passages 136 that extend from the outer surface of body 132, through body 132 and insulator surface 134, to the outer surface of insulator surface 134. Each passage 136 is configured to pass a laser welding beam. Body 132 may be metal, such as aluminum, light-weight steel, etc., and insulator surface 134 may be an electrical insulating material, a dielectric material, etc., such as Teflon, etc. Load plate 130 provides the primary strength, rigidity, etc. for laser welding mask 100', which spans the battery cell carrier and clamps the CCA to the battery cells during laser welding, as discussed below.

Standoff bracket 140 may be disposed between guide plate 110' and load plate 130 to adjust the distance between guide plate 110' and load plate 130, as well as to adjust the preload of clamp springs 122. Standoff bracket 140 formed from metal, composite material, etc., such as aluminum, light-weight steel, carbon fiber, etc.

In the embodiment depicted in FIG. 1B, clamp plungers 120 are generally arranged in 18 rows, and each row includes 4 groups of 3 clamp plungers 120. An edge row and a group of clamp plungers 120 are identified in FIG. 1B. Each group of clamp plungers 120 includes one negative clamp plunger 120n disposed between two positive clamp plungers 120p. In certain embodiments, each group of clamp plungers 120 is disposed below a different passage 136 in load plate 130, and above two adjacent battery cells in the battery cell carrier. Generally, the number and arrangement of clamp plungers 120 depends on the arrangement of the battery cells within the battery cell carrier. At least one clamp spring 122 is disposed between each clamp plunger 120 and load plate 130.

Figure 2:
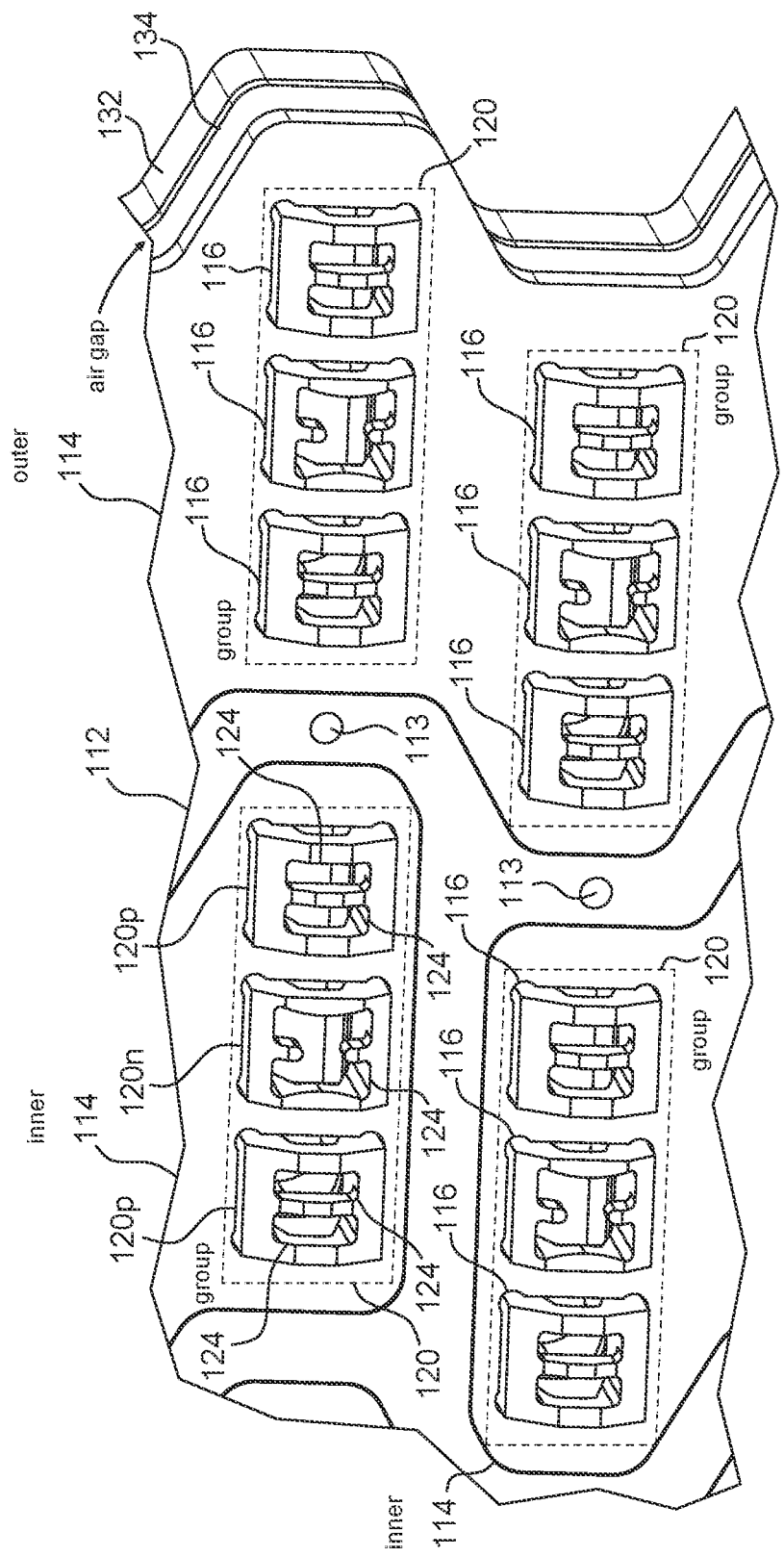
FIG. 2 depicts a partial perspective view of the example laser welding mask depicted in FIG. 1A, in accordance with embodiments of the present disclosure.

FIG. 2 depicts a partial perspective view of laser welding mask 100 depicted in FIG. 1A, in accordance with embodiments of the present disclosure.

Four groups of clamp plungers 120 are identified, as well as the surrounding portions of guide plate 110 and load plate 130 including stiffener portion 112, outer and inner insulator portions 114, body 132 and insulator surface 134. The openings 116 defined by guide plate 110, as well as the air gap between guide plate 110 and insulator surface 134 of load plate 130, are also identified.

Mechanical fasteners 113 may attach stiffener portion 112 to insulator portions 114, such as screws, bolts, rivets, studs, etc.; other attachment methods may also be used.

Each group of clamp plungers 120 includes one negative clamp plunger 120n disposed between two positive clamp plungers 120p. Each negative clamp plunger 120n defines one passage 124, and each positive clamp plunger 120p defines two passages 124. Each passage 124 is configured to pass the laser welding beam.

Generally, a battery cell carrier includes a mechanical structure that supports a large number of cylindrical battery cells, such as 432 lithium 2170 battery cells (5000 mAh), etc. Each battery cell has a central positive terminal and a circumferential negative terminal located on the same end or side of the battery cell. Accordingly, the CCA implements a single-sided cell interconnection architecture using positive tabs that are connected to the positive terminals of the battery cells, and negative tabs that are connected to the negative terminals of the battery cells.

During laser welding, each positive clamp plunger 120p is configured to press a positive tab of the CCA onto the central positive terminal of a single battery cell, and each negative clamp plunger 120n is configured to press a negative tab of the CCA onto respective portions of the circumferential negative terminals of two adjacent battery cells, as described below. Generally, clamp springs 122 generate a combined force of about 10 to 12 Newtons when the CCA is clamped to the battery cells during laser welding.

Figure 3:
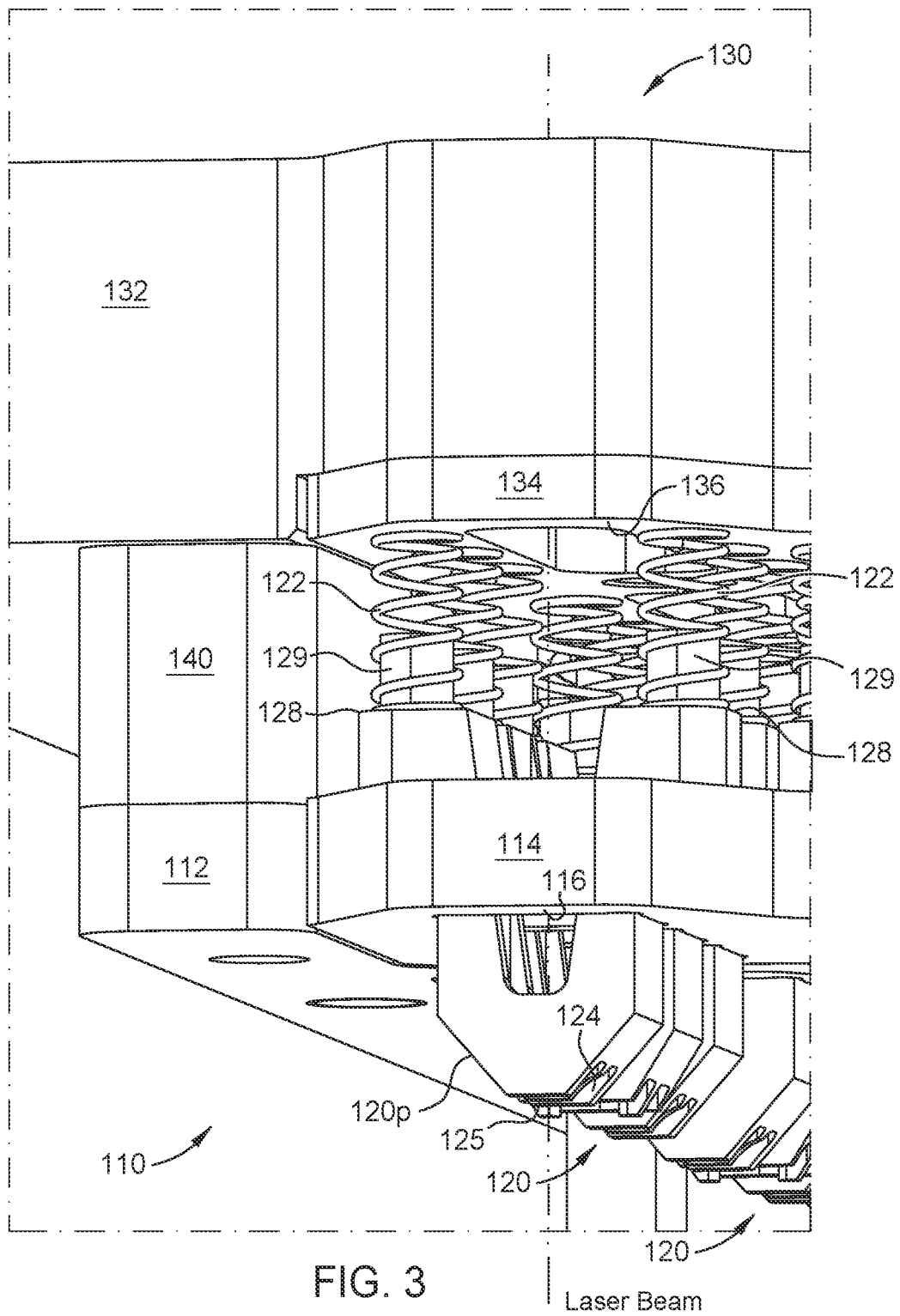
FIG. 3 depicts a partial perspective view of the example laser welding mask depicted in FIG. 1A, in accordance with embodiments of the present disclosure.

FIG. 3 depicts a partial perspective view of laser welding mask 100 depicted in FIG. 1A, in accordance with embodiments of the present disclosure.

Two groups of clamp plungers 120 and their associated clamp springs 122 may be seen, as well as the surrounding portions of guide plate 110 and load plate 130 including stiffener portion 112, insulator portions 114, body 132, and insulator surface 134. Standoff bracket 140, the openings 116 defined by guide plate 110, the passages 136 defined by load plate 130, as well as the air gap between insulator surface 134 and guide plate 110, are also identified.

The outer clamp plunger 120 in the outer-most group of clamp plungers 120 is a positive clamp plunger 120p that includes head portion 126 and tail portion 128. Head portion 126 defines two passages 124, as described above, and has a contact surface 125 that presses against the CCA during laser welding. Tail portion 128 has two sides, and cooperates with the upper surface of insulator portion 114 and two clamp springs 122 to allow positive clamp plunger 120p to translate or slide within opening 116. Cylindrical portions 129 extend from each side of tail portion 128, and each cylindrical portion 129 provides a guide surface for a respective clamp spring 122. An example laser beam is shown descending through passage 136, the air gap between insulator portion 114 and insulator surface 134 of load plate 130, opening 116, and one of the passages 124 in head portion 126.

Similar to positive clamp plunger 120p, negative clamp plunger 120n also includes head portion 126 and tail portion 128. Head portion 126 defines one passage 124, as described above, and has a contact surface 125 that presses against the CCA during laser welding. Tail portion 128 has two sides, and cooperates with the upper surface of insulator portion 114 and two clamp springs 122 to allow negative clamp plunger 120n to translate or slide within opening 116. Cylindrical portions 129 extend from each side of tail portion 128, and each cylindrical portion 129 provides a guide surface for a respective clamp spring 122.

In some embodiments, a single cylindrical portion 129 may be used in cooperation with a single clamp spring 122. The single cylindrical portion 129 may be disposed between, or incorporated within, the two sides of tail portion 128 to provide a guide surface for the single clamp spring 122, and may include a central passage configured to pass the laser welding beam.

Generally, two or more laser welding masks 100, 100' may be attached together to form a multi-panel laser welding mask that compensates for plastic injection molded battery cell carrier dimensional tolerances as well as for battery cell carriers with large dimensional differences (such as different widths, etc.).

Figure 4:
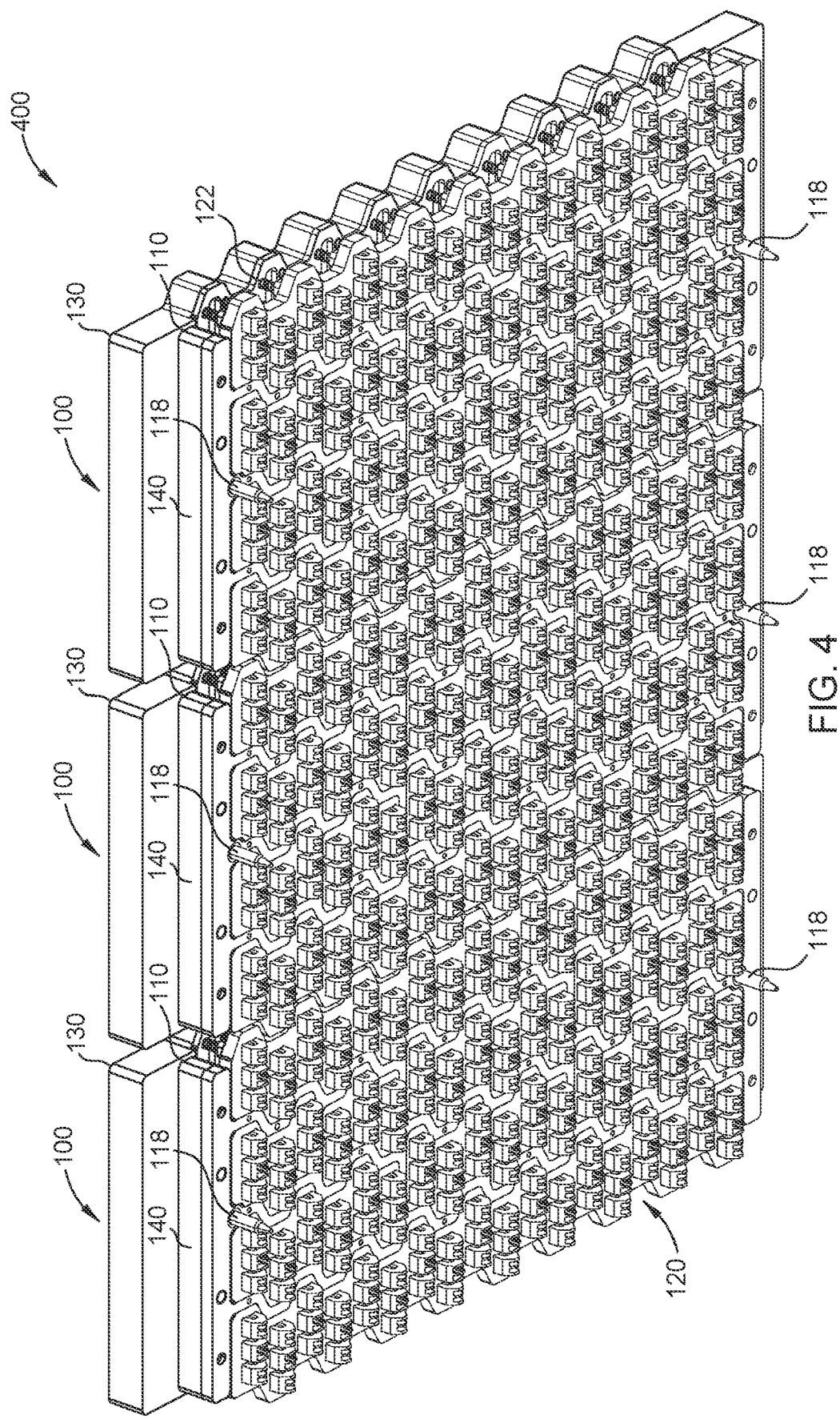
FIG. 4 depicts a perspective view of an example multi-panel laser welding mask, in accordance with embodiments of the present disclosure.

FIG. 4 depicts a perspective view of multi-panel laser welding mask 400, in accordance with embodiments of the present disclosure.

In certain embodiments, multi-panel laser welding mask 400 includes, inter alia, three laser welding masks 100 that are attached together using mechanical fasteners, welding, etc. Each laser welding mask 100 includes guide plate 110, 2 guide pins 118, 216 clamp plungers 120, 432 clamp springs 122, load plate 130, and standoff bracket 140. Accordingly, multi-panel laser welding mask 400 includes a total of 6 guide pins 118, 648 clamp plungers 120, and 1,296 clamp springs 122.

Figure 5:
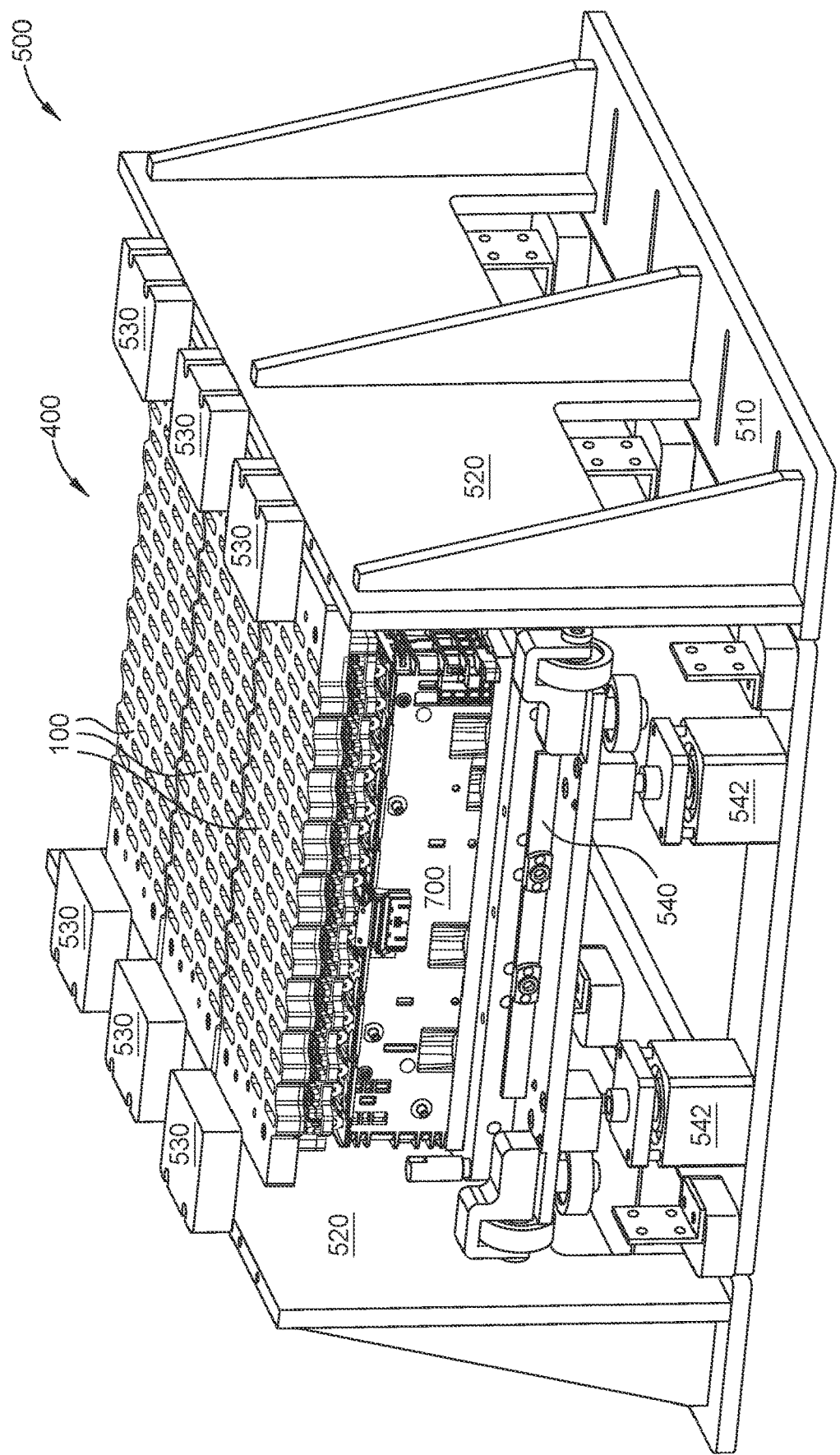
FIG. 5 depicts a perspective view of an example laser welding jig, in accordance with embodiments of the present disclosure.

FIG. 5 depicts a perspective view of laser welding jig 500, in accordance with embodiments of the present disclosure.

In certain embodiments, laser welding jig 500 includes, inter alia, base 510, side walls 520, support blocks 530, articulated table 540, electric motors 542, and multi-panel laser welding mask 400 including three laser welding masks 100. In certain other embodiments, multi-panel laser welding mask 400 may include one, two, four or more laser welding masks 100. The robotic laser welding system is positioned above laser welding jig 500, and is not depicted for clarity.

Multi-panel laser welding mask 400 is attached to one or more support blocks 530 using mechanical fasteners, such as screws, bolts, rivets, studs, etc., such that multi-panel laser welding mask 400 is rigidly supported at a particular height above base 510. For example, multi-panel laser welding mask 400 may be attached to three support blocks 530 connected to one side wall 520, and may abut three support blocks 530 connected to the other side wall 520, to prevent vertical (and horizontal) movement during laser welding. While other, more permanent attachment methods, such as welding, etc., may be used, permanent attachment methods may limit servicing, repairing, or replacing clamp plungers 120 and clamp springs 122 of each laser welding mask 100.

In certain embodiments, articulated table 540 may translate in a horizontal direction from a load position, at which battery cell carrier 700 is received, to a pre-weld position directly under multi-panel laser welding mask 400. Translation in the horizontal direction may be performed manually, electrically, hydraulically, pneumatically, etc. In other embodiments, articulated table 540 does not translate in a horizontal direction, and battery cell carrier 700 is received at the pre-weld position.

Articulated table 540 may translate in a vertical direction from the pre-weld position to a weld position at which multi-panel laser welding mask 400 applies clamping pressure to the CCA and battery cells supported by battery cell carrier 700. Due to the weight of battery cell carrier 700, translation in the vertical direction is typically performed electrically, hydraulically, pneumatically, etc. For example, four electric motors 542 may raise and lower articulated table 540 and battery cell carrier 700 from the pre-weld position to the weld position and vice-versa. Articulated table 540 and battery cell carrier 700 are depicted in the weld position in FIG. 5.

In certain embodiments, laser welding jig 500 may arranged such that articulated table 540 translates in a horizontal direction from the pre-weld position to the weld position, and vice versa.

Figure 6A:
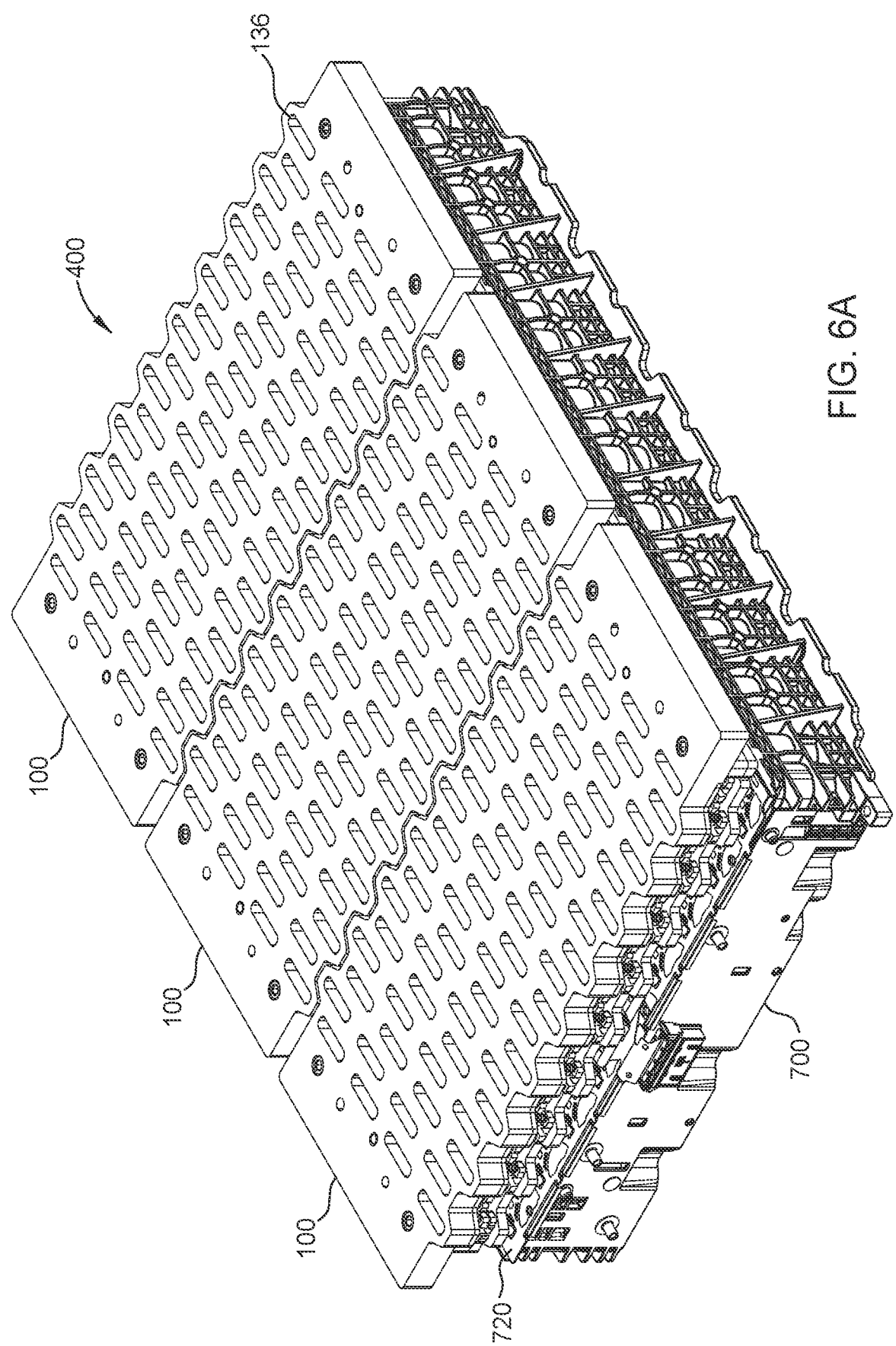
FIGS. 6A and 6B depict perspective views of an example multi-panel laser welding mask and battery cell carrier in a weld position, in accordance with embodiments of the present disclosure.
Figure 6B:
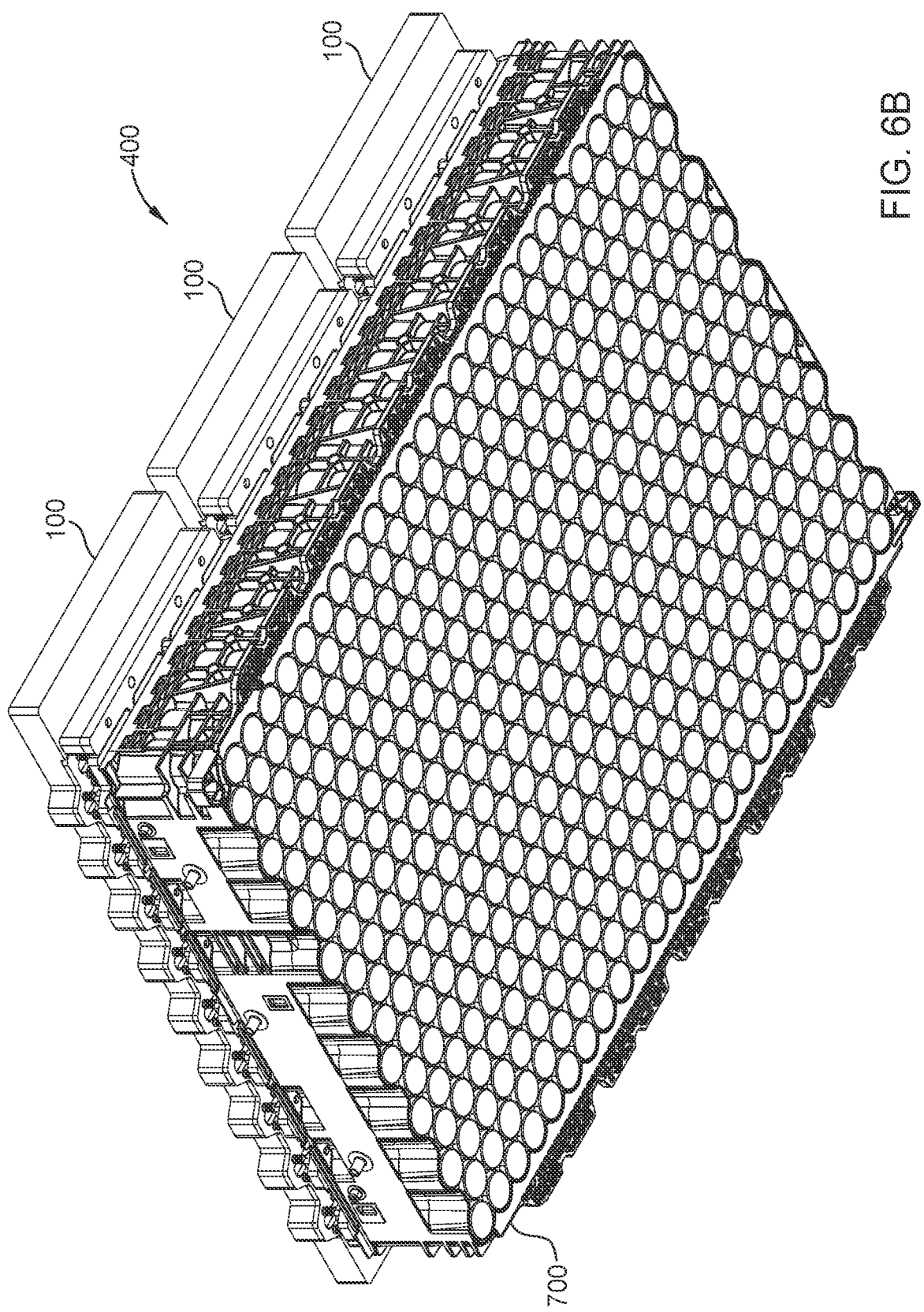

FIGS. 6A and 6B depict perspective views of multi-panel laser welding mask 400 and battery cell carrier 700 in the weld position, in accordance with embodiments of the present disclosure.

Multi-panel laser welding mask 400 and battery cell carrier 700 are depicted in the weld position without the remaining structure of laser welding jig 500. Multi-panel laser welding mask 400 includes three laser welding masks 100, and passages 136 in the load plates 130 of laser welding masks 100 are shown. An edge of CCA 720 is also visible, as well as the mechanical structure of battery cell carrier 700 that supports the battery cells of the battery payload.

Figure 7A:
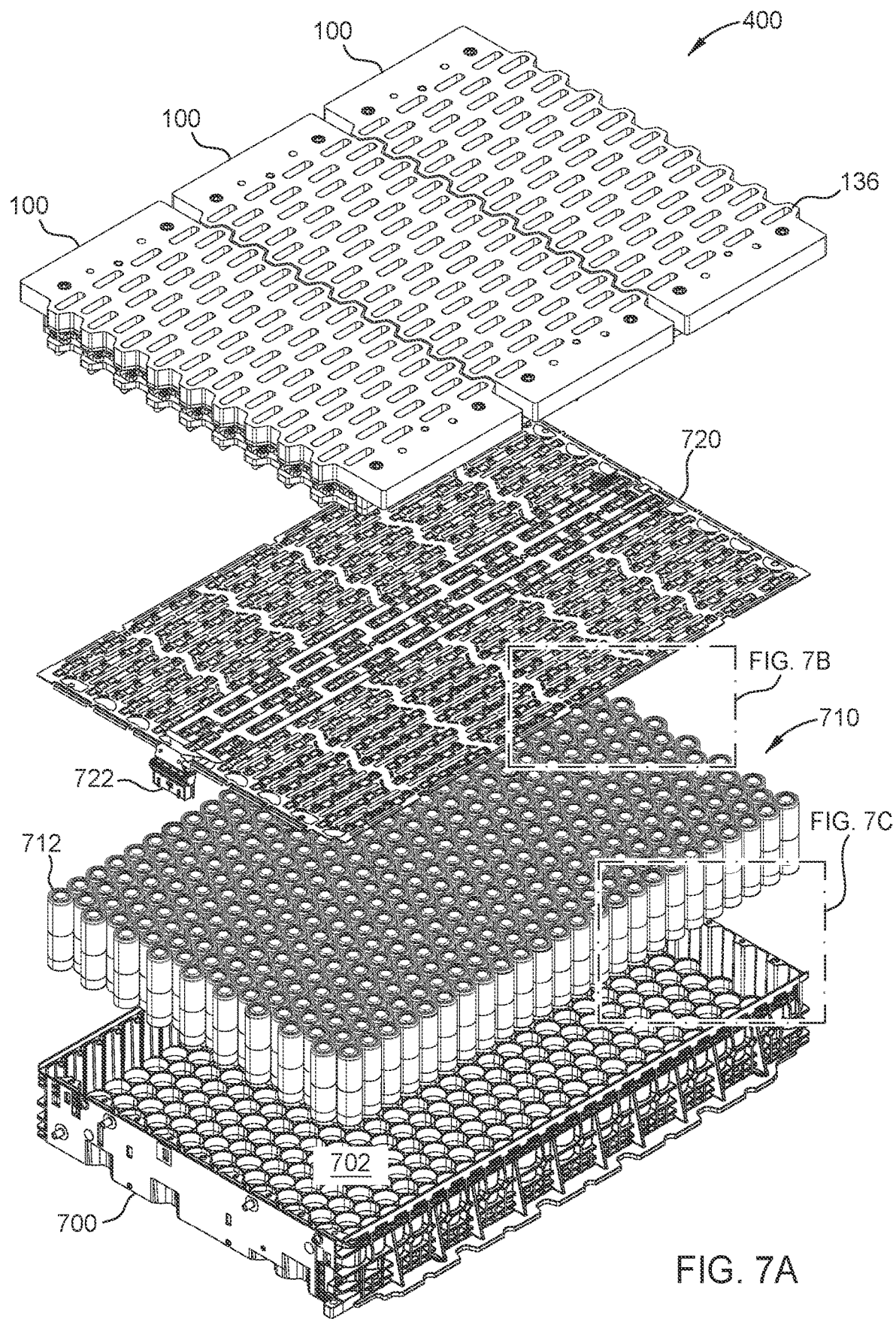
FIG. 7A depicts an exploded perspective view of the multi-panel laser welding mask and battery cell carrier depicted in FIGS. 6A, 6B, in accordance with embodiments of the present disclosure.

FIG. 7A depicts an exploded perspective view of multi-panel laser welding mask 400 and battery cell carrier 700 depicted in FIGS. 6A, 6B, in accordance with embodiments of the present disclosure.

Multi-panel laser welding mask 400 includes three laser welding masks 100, and passages 136 in the load plates 130 of laser welding masks 100 are shown. CCA 720 and bus bar connector 722 are also shown, as well as mechanical structure 702 of battery cell carrier 700 that supports battery cells 712 of battery payload 710.

Figure 7B:
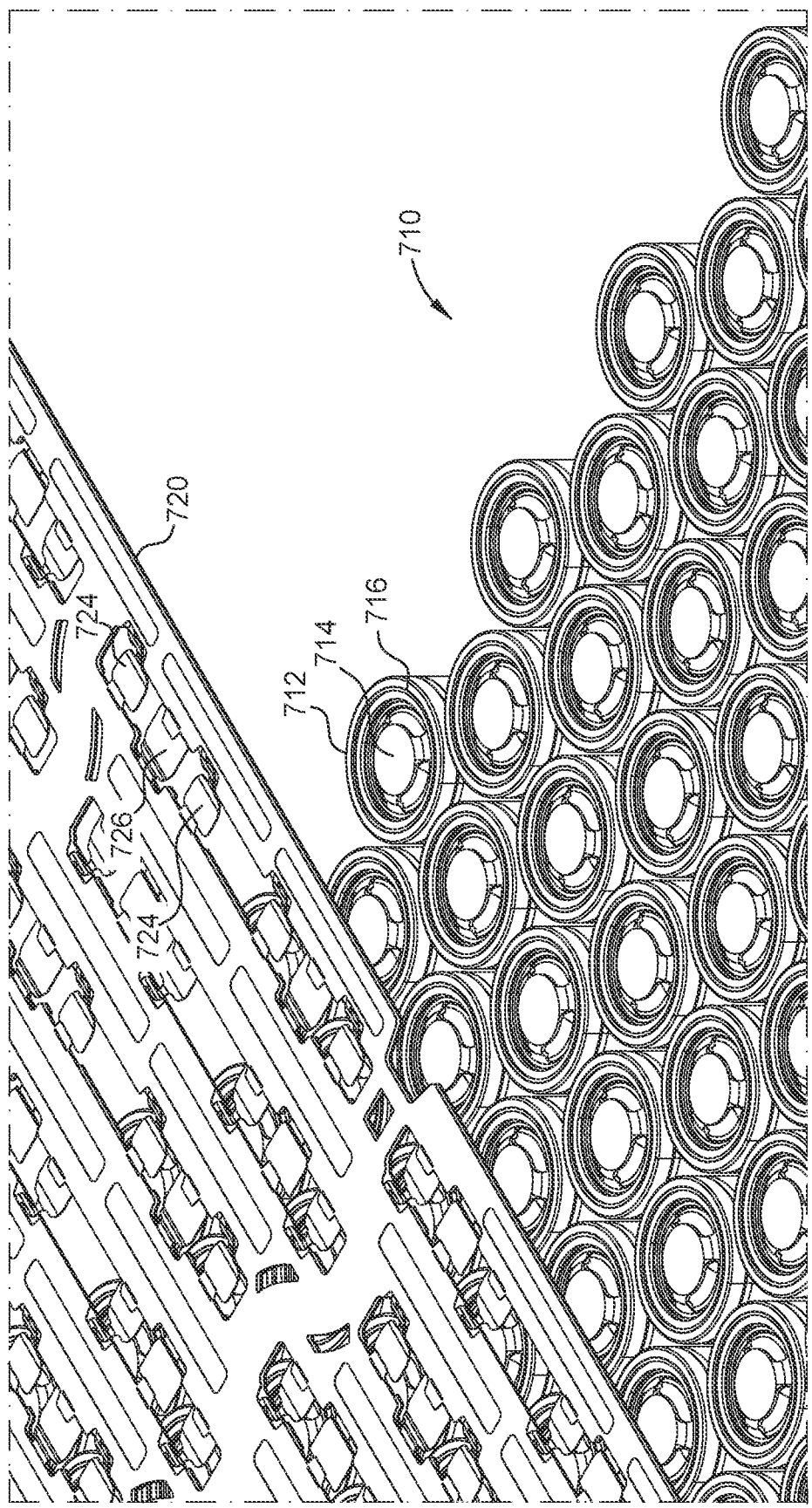
FIG. 7B depicts a partial perspective view of the battery payload and current collector assembly (CCA) depicted in FIG. 7A, in accordance with embodiments of the present disclosure.

FIG. 7B depicts a partial perspective view of battery payload 710 and CCA 720 depicted in FIG. 7A, in accordance with embodiments of the present disclosure.

In certain embodiments, CCA 720 includes positive tabs 724 that are laser welded to the central positive terminal 714 of each battery cell 712 of battery payload 710, and negative tabs 726 that are laser welded to the circumferential negative terminals 716 of each distinct pair of adjacent battery cells 712 of battery payload 710.

Figure 7C:
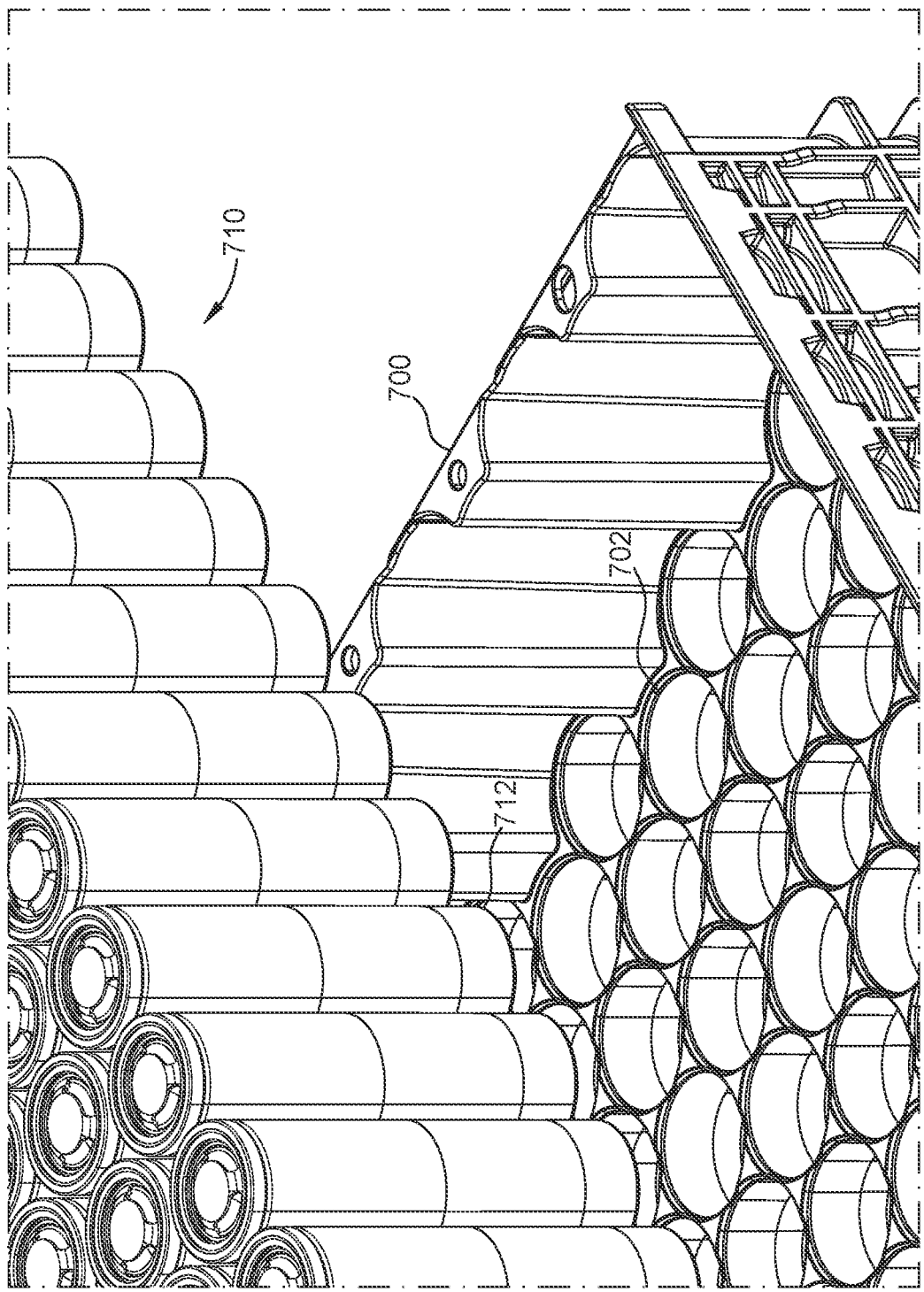
FIG. 7C depicts a partial perspective view of the battery cell carrier and battery payload depicted in FIG. 7A, in accordance with embodiments of the present disclosure.

FIG. 7C depicts a partial perspective view of battery cell carrier 700 and battery payload 710 depicted in FIG. 7A, in accordance with embodiments of the present disclosure.

A portion of mechanical structure 702 of battery cell carrier 700 and several battery cells 712 of battery payload 710 are shown.

Figure 8:
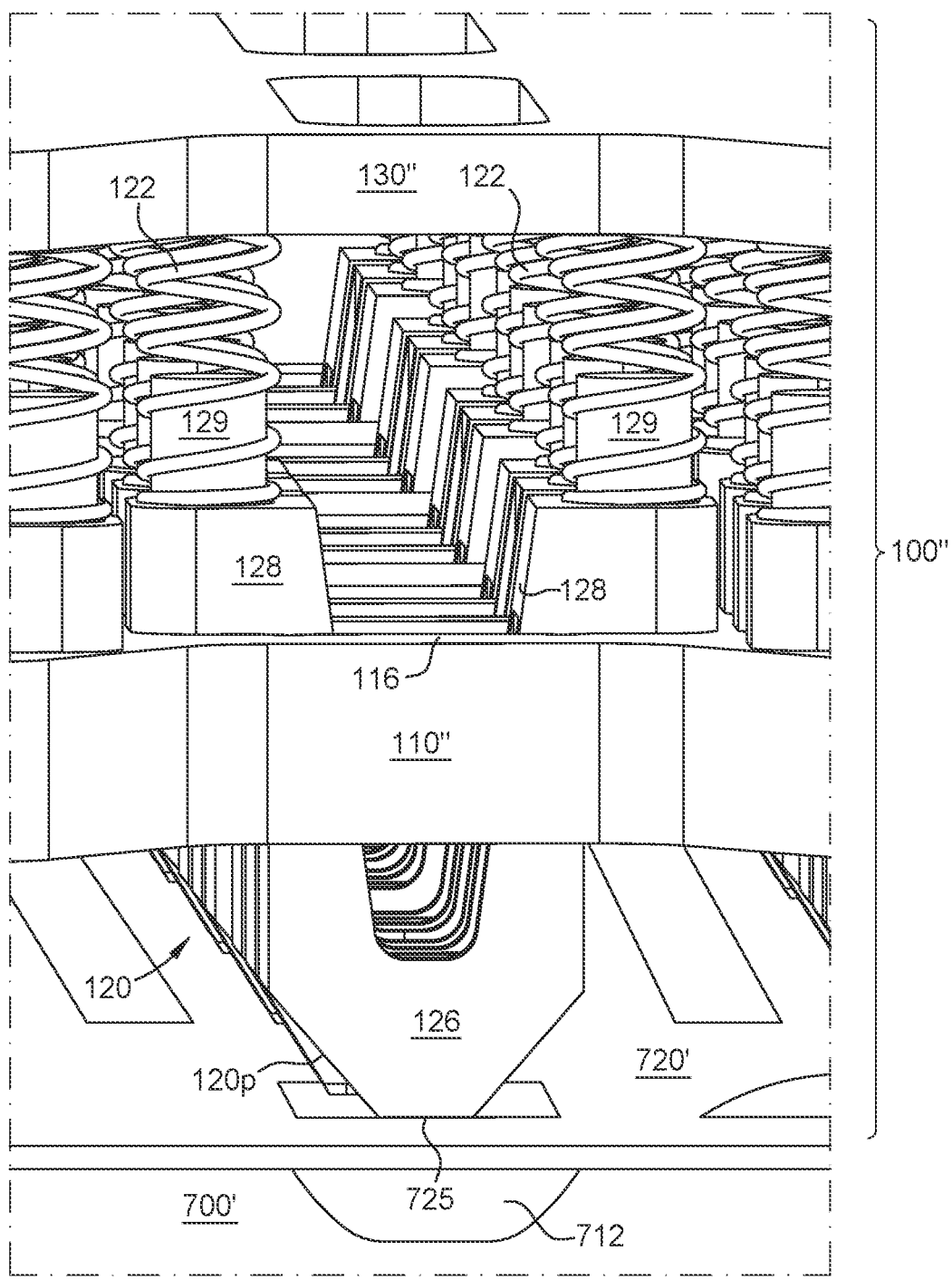
FIG. 8 depicts a partial side view of an example battery cell carrier, CCA, and laser welding mask in the weld position, in accordance with embodiments of the present disclosure.

FIG. 8 depicts a partial side view of battery cell carrier 700', CCA 720', and laser welding mask 100" in the weld position, in accordance with embodiments of the present disclosure.

In certain embodiments, laser welding mask 100" includes, inter alia, insulating guide plate 110", clamp plungers 120, clamp springs 122, and insulating load plate 130". The outer clamp plunger 120 is a positive clamp plunger 120p that includes metal head portion 126 and metal tail portion 128. Head portion 126 defines two passages 124 (not visible), as described above, and has a contact surface 125 that presses against a positive tab 724 (not visible) of CCA 720' onto central positive terminal 714 (not visible) of battery cell 712 during laser welding. Tail portion 128 has two sides, and cooperates with the upper surface of insulating guide plate 110" and two clamp springs 122 to allow positive clamp plunger 120p to translate or slide within opening 116. Cylindrical portions 129 extend from each side of tail portion 128, and each cylindrical portion 129 provides a guide surface for a respective clamp spring 122.

Figure 9:
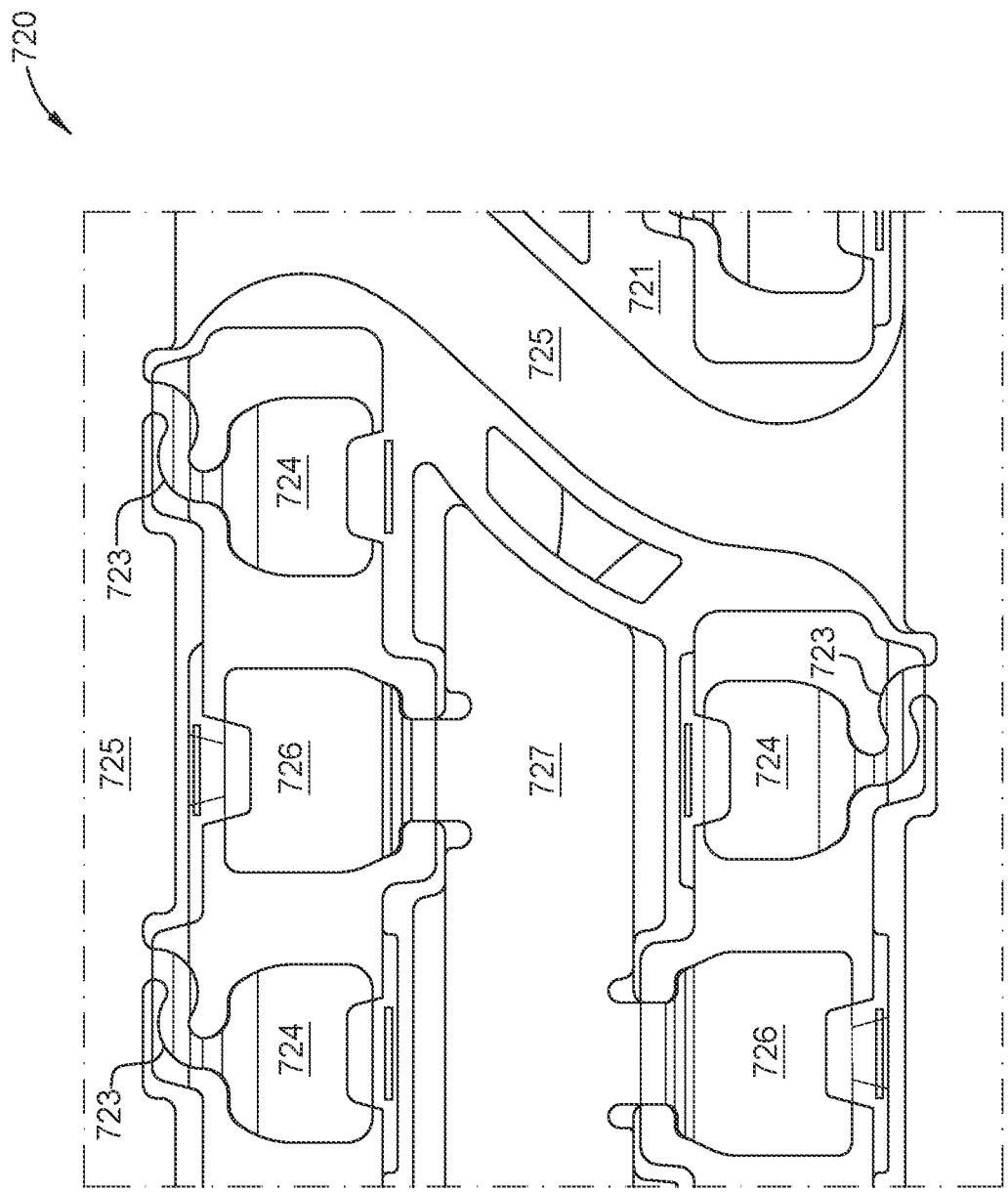
FIG. 9 depicts a partial plan view of an example CCA, in accordance with embodiments of the present disclosure.

FIG. 9 depicts a partial plan view of CCA 720, in accordance with embodiments of the present disclosure.

In certain embodiments, CCA 720 includes, inter alia, an insulating layer (not shown for clarity), and one or more conductive layers 721 that include a number of positive traces 725 that connect the positive tabs 724 to the bus bar connector 722, and a number of negative traces 727 that connect the negative tabs 726 to the bus bar connector 722. In some embodiments, a fuse 723 may connect each positive tab 724 to one of the positive traces 725.

Figure 10:
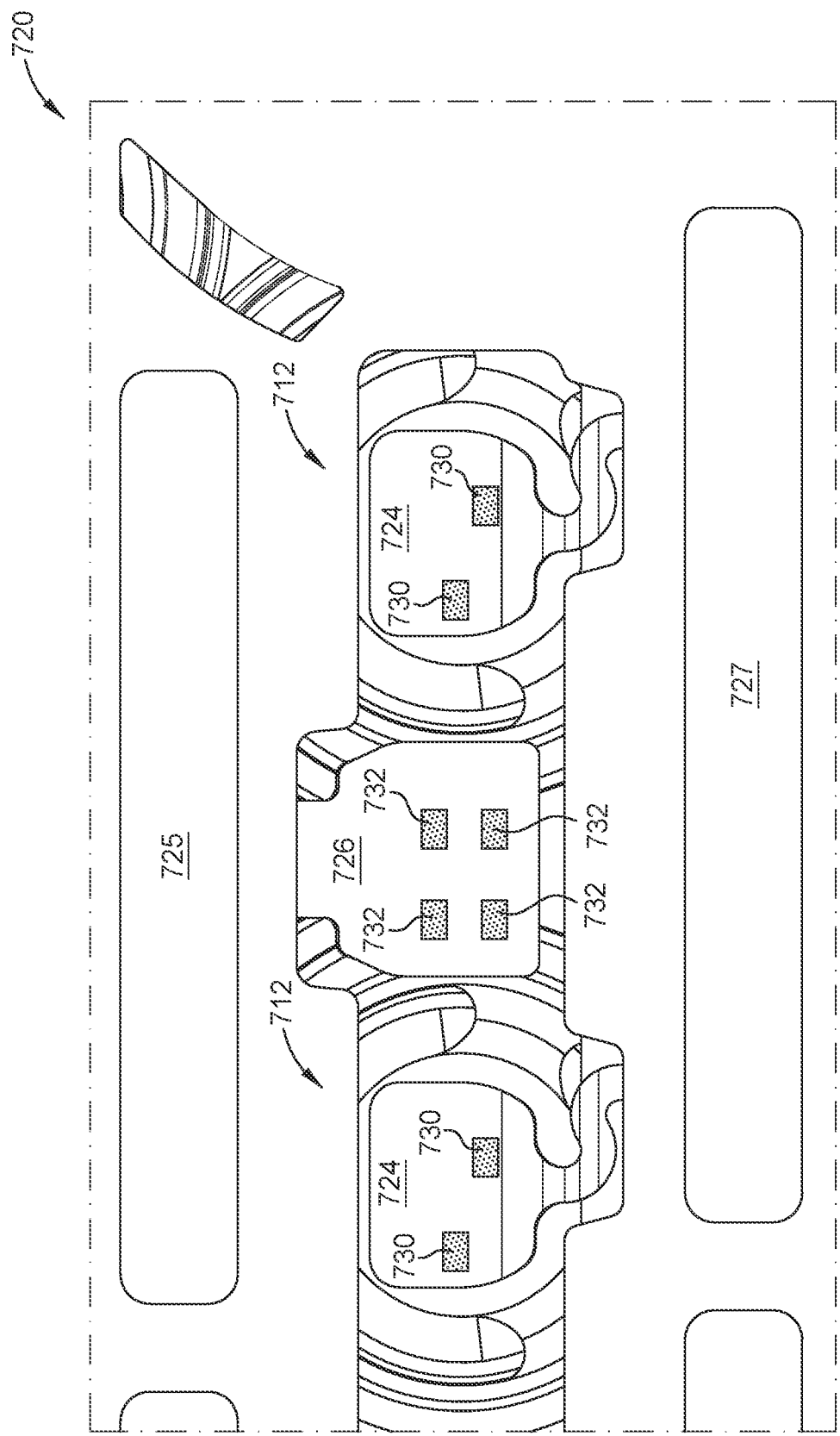
FIG. 10 depicts a top view of the laser welds between a portion of an example CCA and two adjacent battery cells in the battery cell carrier, in accordance with embodiments of the present disclosure.

FIG. 10 depicts a top view of biased laser welds 730 and laser welds 732 between a portion of CCA 720 and two adjacent battery cells 712 in battery cell carrier 700, in accordance with embodiments of the present disclosure.

As discussed with respect to FIG. 9, CCA 720 includes, inter alia, positive traces 725 that connect positive tabs 724 to bus bar connector 722, and negative traces 727 that connect the negative tabs 726 to the bus bar connector 722.

Each positive tab 724 has received a total of two biased laser welds 730, i.e., one pair of biased laser welds to each battery cell 712. In other words, two biased laser welds were applied to the central positive terminal 714 of each adjacent battery cell 712. Negative tab 726 has received a total of four laser welds 732, i.e., one pair of laser welds 732 to each adjacent battery cell 712. In other words, two laser welds 732 were applied to the circumferential negative terminal 716 of each adjacent battery cell 712.

Biased laser welds 730 advantageously compensate for misalignment or tilt of the battery cells 712 with respect to CCA 720, and, more particularly, for misalignment or tilt of the battery cells 712 with respect to positive tabs 724 and negative tabs 726 of CCA 720.

Figure 11:
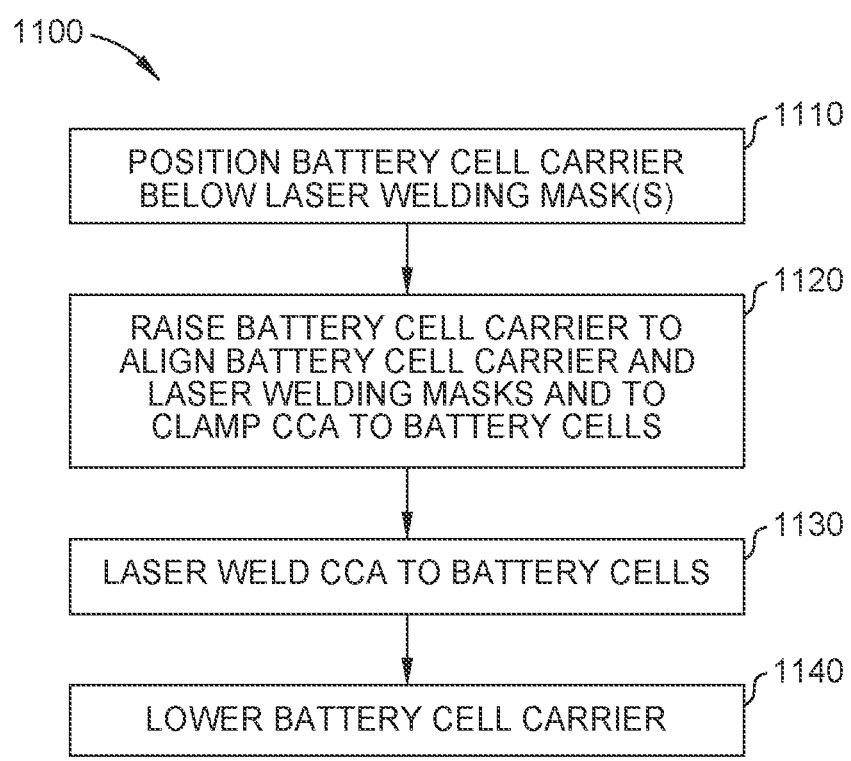
FIG. 11 depicts a flow chart representing functionality associated with facilitating laser welding, in accordance with embodiments of the present disclosure.

FIG. 11 depicts flow chart 1100 representing functionality associated with facilitating laser welding, in accordance with embodiments of the present disclosure.

Battery cell carrier 700 is provided to laser welding jig 500 from a conveyor system, a forklift, a dolly or trolley, etc. In certain embodiments, battery cell carrier 700 is provided to the load position of laser welding jig 500, while in other embodiments, battery cell carrier 700 is provided to the pre-weld position of laser welding jig 500.

At 1110, laser welding jig 500 positions battery cell carrier 700 below one or more laser welding masks 100, such as a single laser welding mask 100, a multi-panel laser welding mask 400 with three laser welding masks 100, etc. Generally, battery cell carrier 700 supports battery cells 712 of battery payload 710 and CCA 720. Each laser welding mask 100 includes a guide plate 110 and a number of clamp plungers 120 slidingly disposed within respective openings 116 in guide plate 110, as discussed above.

At 1120, laser welding jig 500 moves (e.g., raises) battery cell carrier 700 to align battery cell carrier 700 and laser welding masks 100 and to press clamp plungers 120 of laser welding masks 100 onto CCA 720 to clamp CCA 720 to battery cells 712 of battery payload 710.

At 1130, the robotic laser welding system laser welds CCA 720 to battery cells 712 of battery payload 710 using a laser welding beam.

At 1140, battery cell carrier 700 is moved (e.g., lowered) to unclamp CCA 720 from battery cells 712 of battery payload 710.

Battery cell carrier 700 is then removed from laser welding jig 500 and provided to the conveyor system, forklift, dolly or trolley, etc.

Example Embodiments

In one embodiment, a method for facilitating laser welding includes positioning a battery cell carrier below one or more laser welding masks, pressing clamp plungers of the laser welding masks onto a CCA to clamp the CCA to the battery cells in the battery carrier, and laser welding the CCA to the battery cells using a laser welding beam.

In a further embodiment of the method, each laser welding mask comprises a guide plate in which the clamp plungers are disposed, the battery cell carrier comprises a plurality of guide pin openings, each guide plate comprises a plurality of guide pins, and the method further comprises prior to the pressing, aligning the battery cell carrier with the laser welding masks by directing each guide pin into a respective guide pin opening.

In a further embodiment of the method, each guide plate comprises a first tapered pin disposed at one end of the guide plate and a second tapered pin disposed at an opposite end of the guide plate, and, during the aligning, the first tapered pin is directed into a respective circular-shaped opening in the battery cell carrier, and the second tapered pin is directed into a respective oval-shaped opening in the battery cell carrier.

In a further embodiment of the method, each guide plate is attached to a load plate, the load plate defines a plurality of passages and each passage is configured to pass the laser welding beam, each clamp plunger defines at least one passage that is configured to pass the laser welding beam, at least one clamp spring is disposed between each clamp plunger and the load plate, the clamp plungers are arranged in groups of clamp plungers, and, during the laser welding, each group of clamp plungers is disposed below a different passage in the load plate and above two adjacent battery cells in the battery cell carrier.

In a further embodiment of the method, each group of clamp plungers comprises a negative clamp plunger disposed between two positive clamp plungers, each positive clamp plunger defines two passages, and each passage is configured to pass the laser welding beam, and, during the laser welding, each positive clamp plunger presses a positive tab of the CCA onto a central positive terminal of one battery cell, and each positive tab of the CCA receives one pair of biased laser welds to one battery cell.

In a further embodiment of the method, each negative clamp plunger defines a passage that is configured to pass the laser welding beam, during the laser welding, each negative clamp plunger presses a negative tab of the CCA onto respective portions of circumferential negative terminals of two adjacent battery cells, and, during the laser welding, each negative tab of the CCA receives one pair of laser welds to each adjacent battery cell.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An apparatus, comprising:
a guide plate, attached to a load plate, the guide plate defining a plurality of openings;
a plurality of clamp plungers, each clamp plunger disposed within at least one of the plurality of openings in the guide plate, each clamp plunger defining at least one passage configured to pass a laser welding beam; and
a plurality of clamp springs, at least one clamp spring disposed between at least one of the plurality of clamp plungers and the load plate.

2. The apparatus of claim 1, wherein:
the guide plate further comprises a plurality of guide pins extending from a lower surface of the guide plate; and
the guide pins are configured to align the guide plate with a battery cell carrier.

3. The apparatus of claim 2, wherein:
the plurality of guide pins comprise:
a first tapered pin disposed at one end of the guide plate, and
a second tapered pin is disposed at an opposite end of the guide plate;
the first tapered pin is configured to be received by a respective circular-shaped opening in the battery cell carrier; and
the second tapered pin is configured to be received by a respective oval-shaped opening in the battery cell carrier.

4. The apparatus of claim 2, wherein:
the plurality of clamp plungers is arranged in groups of clamp plungers;
each group of clamp plungers comprises a negative clamp plunger disposed between two positive clamp plungers; and
each group of clamp plungers is disposed below a different passage in the load plate.

5. The apparatus of claim 4, wherein:
the battery cell carrier comprises a plurality of battery cells arranged in a same orientation;
each battery cell comprises a central positive terminal disposed on an upper end, and a circumferential negative terminal disposed on the upper end; and
each group of clamp plungers is disposed above two adjacent battery cells in the battery cell carrier.

6. The apparatus of claim 5, wherein:
each negative clamp plunger defines a passage that is configured to allow the laser welding beam to pass; and
each negative clamp plunger is configured to press a negative tab of a current collector assembly (CCA) onto respective portions of circumferential negative terminals of two adjacent battery cells.

7. The apparatus of claim 6, wherein:
each positive clamp plunger defines two passages, and each passage is configured to allow the laser welding beam to pass; and
each positive clamp plunger is configured to press a positive tab of the CCA onto the central positive terminal of a single battery cell.

8. The apparatus of claim 7, wherein:
each negative tab of the CCA is configured to receive one pair of laser welds to each adjacent battery cell; and each positive tab of the CCA is configured to receive one pair of biased laser welds to one battery cell.

9. The apparatus of claim 8, wherein the CCA comprises:
an insulating layer, and
at least one conductive layer that comprises a plurality of positive traces connecting the positive tabs, and a plurality of negative traces connecting the negative tabs.

10. A method for facilitating laser welding, the method comprising:
positioning a battery cell carrier below one or more laser welding masks, the battery cell carrier supporting a plurality of battery cells and a current collector assembly (CCA);
pressing clamp plungers of the laser welding masks onto the CCA to clamp the CCA to the battery cells; and
laser welding the CCA to the battery cells using a laser welding beam.

11. The method of claim 10, wherein pressing the clamp plungers of the laser welding masks onto the CCA generates a combined force of about 10 to 12 Newtons.

12. The method of claim 10, wherein:
each laser welding mask comprises a guide plate in which the clamp plungers are slidingly disposed;
the battery cell carrier comprises a plurality of guide pin openings;
each guide plate comprises a plurality of guide pins; and
during the positioning, each guide pin is directed into a respective guide pin opening to align the battery cell carrier to the laser welding masks.

13. The method of claim 12, wherein:
each guide plate comprises a first tapered pin disposed at one end of the guide plate, and a second tapered pin disposed at an opposite end of the guide plate; and
during the positioning, the first tapered pin is directed into a respective circular-shaped opening in the battery cell carrier, and the second tapered pin is directed into a respective oval-shaped opening in the battery cell carrier.

14. The method of claim 10, wherein:
each guide plate is attached to a load plate;
the load plate defines a plurality of passages, and each passage is configured to pass the laser welding beam;
each clamp plunger defines at least one passage that is configured to pass the laser welding beam;
at least one clamp spring is disposed between each clamp plunger and the load plate;
the clamp plungers are arranged in groups of clamp plungers; and
during the laser welding, each group of clamp plungers is disposed below a different passage in the load plate and above two adjacent battery cells in the battery cell carrier.

15. The method of claim 14, wherein:
each group of clamp plungers comprises a negative clamp plunger disposed between two positive clamp plungers;
each positive clamp plunger defines two passages, and each passage is configured to pass the laser welding beam;
during the laser welding, each positive clamp plunger presses a positive tab of the CCA onto a central positive terminal of one battery cell; and
during the laser welding, each positive tab of the CCA receives one pair of biased laser welds to one battery cell.

16. An apparatus to facilitate laser welding, the apparatus comprising:
one or more laser welding masks, each laser welding mask comprising:
a guide plate, attached to a load plate, the guide plate defining a plurality of openings that extend from an upper surface to a lower surface;
a plurality of clamp plungers, each clamp plunger disposed within one of the openings in the guide plate, each clamp plunger defining at least one passage configured to pass a laser welding beam; and
a plurality of clamp springs, at least one clamp spring disposed between at least one clamp plunger and the load plate; and
a support base configured to:
position a battery cell carrier below the laser welding masks, the battery cell carrier supporting a plurality of battery cells and a current collector assembly (CCA), and
move the battery cell carrier to align the battery cell carrier and the laser welding masks and to press the clamp plungers of the laser welding masks onto the CCA to clamp the CCA to the battery cells during laser welding.

17. The apparatus of claim 16, wherein:
each load plate defines a plurality of passages extending from an upper surface to a lower surface; and
each of the plurality of passages is configured to pass the laser welding beam.

18. The apparatus of claim 17, wherein:
each load plate comprises a body and an insulator surface; and
each guide plate comprises a stiffener portion and a plurality of insulator portions.

19. The apparatus of claim 16, wherein the clamp plungers comprise insulating material.

20. The apparatus of claim 16, wherein:
each guide plate further comprises a plurality of guide pins extending from a lower surface of the guide plate; and
the guide pins are configured to align the guide plate with a battery cell carrier.

* * * * *